US007837340B2

(12) United States Patent
Watters

(10) Patent No.: US 7,837,340 B2

(45) Date of Patent: Nov. 23, 2010

(54) TELESCOPE MULTIPLE DISCRETE SEGMENT PRIMARY MIRROR

(76) Inventor: George Watters, 6126 E. Willow Springs Rd., Spokane, WA (US) 99223

( * ) Notice: Subject to any disclaimer, the term of this patent is extended or adjusted under 35 U.S.C. 154(b) by 414 days.

(21) Appl. No.: 11/782,534

(22) Filed: Jul. 24, 2007

(65) Prior Publication Data

US 2009/0027789 A1 Jan. 29, 2009

(51) Int. Cl.
*G02B 5/08* (2006.01)

(52) U.S. Cl. ...................................................... 359/846

(58) Field of Classification Search ................. 359/399, 359/846, 849, 851, 853

See application file for complete search history.

(56) References Cited

U.S. PATENT DOCUMENTS 4,202,605 A * 5/1980 Heinz ......................... 359/845
5,265,034 A * 11/1993 Breckenridge et al. ... 250/201.1
6,226,121 B1 5/2001 Atkinson et al.
6,885,501 B1 4/2005 Popil
2004/0160118 A1 8/2004 Knollenberg et al.
2005/0088734 A1 4/2005 Basu
2005/0141108 A1* 6/2005 Atkinson et al. ............ 359/820
2005/0237644 A1* 10/2005 Rhoads ....................... 359/872
2005/0254111 A1 11/2005 Griffith et al.

* cited by examiner

*Primary Examiner*—Euncha P Cherry
(74) *Attorney, Agent, or Firm*—Joseph T. Leone, Esq.; DeWitt Ross & Stevens S.C.

(57) ABSTRACT

A method and apparatus is configured for reflecting a beam of light incident at a primary mirror by rotating a first mirror segment to align a selected facet of the mirror segment to be generally orthogonal to the principal axis. The first mirror segment is translated in a motion parallel to the principal axis to a first position such that the mirrored segment at a facet comprising a mirror is brought into alignment with at least one second mirrored segment to form at a facet a first parabolic mirror. The incident beam of light is then reflected by collimating the first parabolic mirror by rotation and translation of the first mirror segment to strike a first secondary element.

16 Claims, 7 Drawing Sheets

10
12
15
24
15'
24'
27
27
27
18

63
60
48
57
t
54
10
a
51
51

TELESCOPE MULTIPLE DISCRETE SEGMENT PRIMARY MIRROR

FIELD OF THE INVENTION

This invention relates generally to reflective telescopes and, more specifically, to the primary mirror segment technology.

BACKGROUND OF THE INVENTION

A reflecting telescope (reflector) is an optical telescope which uses a combination of curved or plane (flat) mirrors to reflect light and form an image (catoptric), rather than lenses to refract or bend light to form an image (dioptric).

A curved primary mirror is the reflector telescope's basic optical element which creates an image at the focal plane. The distance from the mirror to the focal plane is called the focal length. Film or a digital sensor may be located here to record the image, or an eyepiece for visual observation.

Mirrors eliminate chromatic aberration but still produce other types of aberrations. In general, on axis they produce spherical aberration—the outer and inner zones of the telescope do not share a common focus. This was the construction flaw in the Hubble Space Telescope mirrors. Spherical aberration can be eliminated with aspheric (non-spherical) mirrors. Off axis, additional aberrations will become apparent.

Nearly all large research-grade astronomical telescopes are reflectors. Lenses work because of the phenomenon of refraction rather than reflection. Therefore, in a lens, the entire volume of material has to be free of imperfection and nonhomogeneities, whereas in a mirror, only one surface has to be perfectly polished. Refraction of light is uniform only across a single wavelength. Light of different wavelengths travels through any translucent medium other than a vacuum at different speeds. Thus, chromatic aberration, the focusing of light of different wavelengths occurring at different focal points, occurs in uncorrected lenses, causing the creation of an aberration-free large lens to be a costly process. Because a mirror reflects different wavelengths at the same angle, chromatic aberration is not a concern.

Reflectors work in a wider spectrum of light since certain wavelengths are absorbed when passing through glass elements like those found in a refractor or catadioptric. Collection and transmission of the spectrum of light is an important role of a telescope, and thus absorption of some portion of the spectrum compromises the purpose of the telescope. People often mistakenly believe that the power of a telescope lies in its ability to magnify objects. Telescopes actually work by collecting more light than the human eye can capture on its own. The larger a telescope's mirror, the more light it can collect, and the better its vision.

Reflecting mirrors are superior to lenses in their ability to resist deformation due to the effects of gravity upon their structure. Mirrors can be supported from behind, and they do not absorb any wavelengths of light, or cause chromatic errors, the way lenses do. Larger mirrors, however, require an elaborately complex structural support system to keep the structure of the mirror from collapsing under its own enormous weight. Also, the larger a surface of a mirror, the thicker it must be in order to withstand gravitational affects that could alter its shape. As the size swells, therefore, the cost of the mirror becomes exorbitant.

An additional issue with weight is the cost of sending such weight into space. Propellant will be more than 85% of the mass that needs to be lofted into Low Earth Orbit (LEO) in placement of any object. Thus, every gram of weight on earth requires an additional nearly 6 grams of propellant to place that gram into LEO. Thus, when the Hubble Space Telescope's launch in 1990 placed a reflective mirror in an orbit about Earth, the size of the objective mirror was limited in a "weight versus cost" decision. Yet, Hubble's position above the atmosphere, which distorts and blocks the light that reaches our planet, gives it a view of the universe that typically far surpasses that of ground-based telescopes. Weight is an ongoing concern as more space telescopes are planned.

One solution to the problem that mass and its gravitational attribute, weight, have on mirrors has been addressed by 36 hexagonal segments of the 400 inch Keck Telescope at the W. M. Keck Observatory at the summit of Mauna Kea in Hawaii. The Keck Telescope's revolutionary design employs 36 individual lightweight glass mirror segments which together, under the control of a computer, maintain a single, precise hyperbolic surface accurate to within a millionth of an inch. They are not 36 separate hyperbolic mirrors. They are 36 segments of a single hyperbolic mirror. The attitude of each of the 36 mirror segments is adjusted twice a second under the control of a computer. The computer looks at input provided by sensors located at each segment's edge. The computer drives three actuators underneath each segment to keep all 36 segments in a perfect hyperbolic shape as the telescope moves, or as it is buffeted by the wind. Thus, with the availability of computer control, it was not necessary to create a single, rigid, monolithic 10-m diameter piece of glass, which would be very difficult or impossible to deal with.

However, the Keck design still suffers from a vast shortcoming. Both telescopes are primarily optical telescopes with coatings that allow no ability to explore either of the near infrared or ultraviolet extremes of the mirrored spectrum. An optical coating is a thin layer of material placed on an optical component such as a lens or mirror which alters the way in which the optic reflects and transmits light. One type of optical coating is the high-reflector coating which can be used to produce mirrors which reflect much of the spectrum of light which falls on them. More complex optical coatings exhibit high reflection over some range of wavelengths, and anti-reflection over another range, allowing the production of dichroic thin-film optical filters. All coatings suffer from the fact that a coating can only be optimized to reflect a portion of the spectrum.

Additionally, different types of mirrors exist. The familiar metallic mirror is omnidirectional, which means it reflects light from every angle. It also absorbs a significant portion of the incident light.

Dielectric mirrors, unlike metallic mirrors, do not conduct electricity and therefore can reflect light more efficiently. Light travels in dielectric materials at speeds that are lower than in air. When light traveling in a particular direction through one type of dielectric material encounters another type, part of the light is reflected while the other part is transmitted at a different angle.

Dielectric mirrors are made of multiple layers of transparent dielectric materials. Such materials, which can be made to be extremely low loss compared to their metallic counterparts, are used to reflect a prescribed range of frequencies coming from within a limited set of angles. Dielectric mirrors are used in devices such as lasers, which need very high reflectivity.

What is missing in the art is a means for using a single telescope structure to support a greater primary mirror element and further to allow for the observation of phenomena at different spectral ranges within the single telescope.

SUMMARY OF THE INVENTION

A method and apparatus is configured for reflecting a beam of light incident at a primary mirror by rotating a first mirror segment to align a selected facet of the mirror segment to be generally orthogonal to the principal axis. The first mirror segment is translated in a motion parallel to the principal axis to a first position such that the mirrored segment at a facet comprising a mirror is brought into alignment with at least one second mirrored segment to form at a facet a first parabolic mirror. The incident beam of light is then reflected by collimating the first parabolic mirror by rotation and translation of the first mirror segment to strike a first secondary element.

The present invention comprises a system for multiply configurable optical properties in a single primary mirror support structure. The structure includes multiple translational actuator assemblies responsive to a processor. Individual translational actuator assemblies can be configured to simultaneously illuminate multiple sensors by reflecting incident light traveling parallel to the principal axis of the telescope.

In accordance with further aspects of the invention, a self-collimation process means that the primary mirror is less dependent upon precise figuring tolerances across the surface of the primary at the time of polishing of the primary segments. Facets of each segment can be separately figured to precise tolerances and then collimated individually to achieve similar performance to a monolithic primary mirror. Additionally, mirror segments can be replaced to cure defects in the primary without replacement of the entire reflecting surface. After figuring of each of the facets, the self-collimation of the primary in interaction with the processor assures performance comparable to the non-defective monolithic primary mirror.

In accordance with other aspects of the invention, the primary mirror support structure may be modularly configured for remote assembly. By way of non-limiting example, a massive primary mirror assembly can be launched into LEO by multiple transits each with one or several of the primary mirror support structure modules for assembly in space. Once in space and assembled, each of the included primary mirror segments can be collimated by interaction with the processor to constitute a primary mirror that is far lighter than a comparable monolithic primary mirror.

In accordance with still further aspects of the invention, multiple primary mirror reflective surfaces are figured on the several facets of a primary mirror segment. The facets allow for optimal selection of reflective surfaces in accord with the phenomenon selected for observation. In one embodiment, a non-uniform reflective surface comprising a plurality of optical coatings may be configured to give a fuller spectral image of a phenomenon by selective activation of actuator assemblies, thereby exposing a non-homogenous plurality of facets to the light incident to the mirror segments. In another embodiment, a plurality of sensors may simultaneously receive reflected light from the array of mirror segments responsive to selective activation signals from the processor.

As will be readily appreciated from the foregoing summary, the invention provides a multiply configurable primary mirror with more versatile performance characteristics than is physically possible to combine in a single monolithic mirror.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
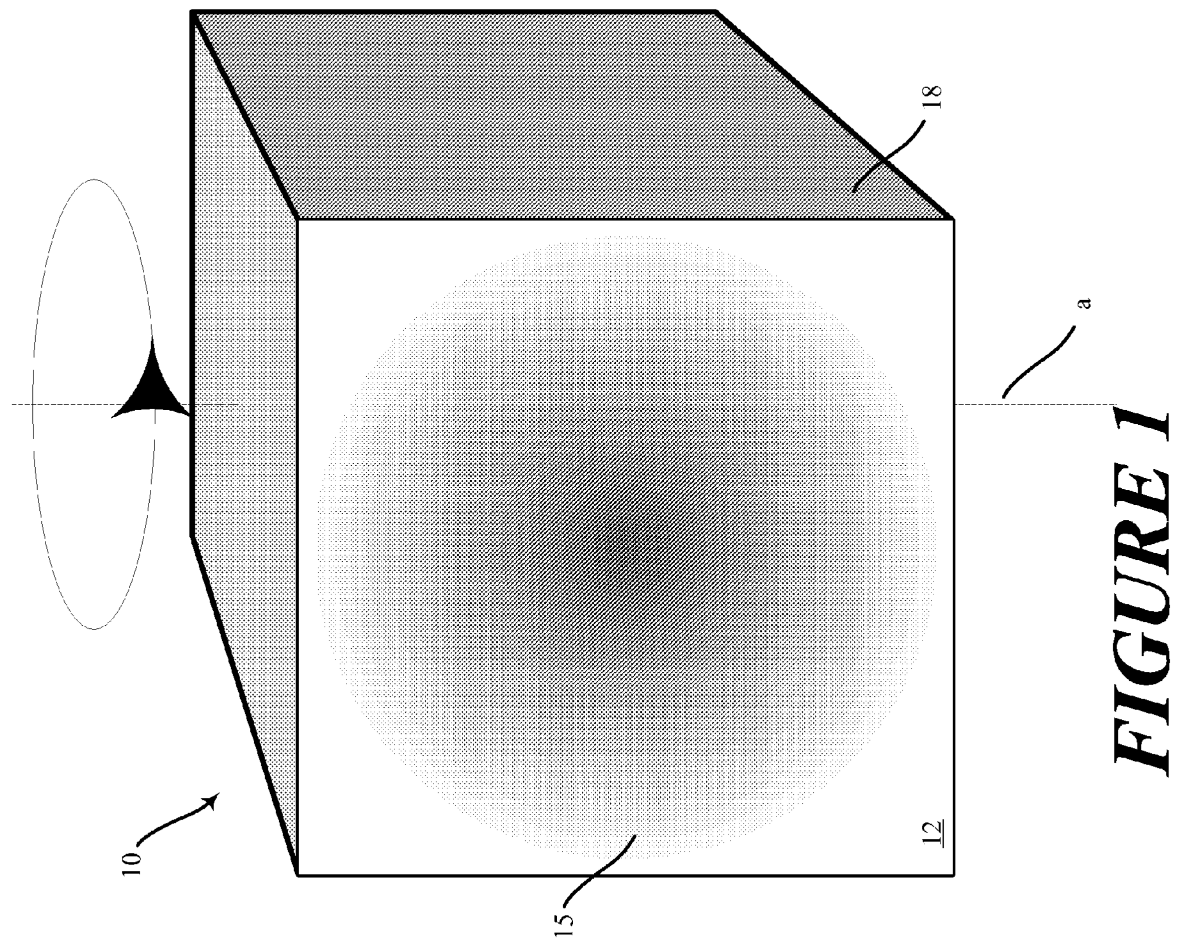
FIG. 1 is a perspective view of a regular cubic embodiment of a primary mirror segment.

Referring to FIG. 1, a primary mirror (or primary) is the principal light-gathering surface of a reflective telescope. A mirror segment 10 is a convex regular polyhedron mounted to rotate about an axis a. For purposes of non-limiting explanation, the mirror segment is portrayed as a cube and the axis a is shown to intersect a first square face of the cube at the center of the square face passing out of the cube in the center of a second square face in opposing relation to the first square face. The mirror segment 10 is thereby allowed to rotate in only about a single axis. This exemplary embodiment will be shown in the succeeding diagrams in order to clearly set forth the advantages of the inventive solution.

Nonetheless, any convex polyhedron may suitably serve as a mirror segment. Regular convex polyhedrons give the advantage of having multiple congruent faces, each of equal area. One group of regular convex polyhedrons is a group of five polyhedrons consisting of the tetrahedron, the hexahedron or cube, the octahedron, the dodecahedron, and the icosahedron. Collectively this group is known as the Platonic solids.

Another group with suitable polyhedrons to serve as mirror segments is the 13 Archimedean solids. The Archimedean solids are those solids having a highly symmetric, semi-regular convex polyhedron composed of two or more types of regular polygons meeting in identical vertices. They are distinct from the Platonic solids, which are composed of only one type of polygon meeting in identical vertices. The mirror segment 10 might be suitably configured to any convex polyhedron.

Additionally, while shown in the non-limiting exemplary embodiment to intersect the mirror segment 10 at a face, the axis of rotation need not be so constrained. In one preferred embodiment, for example, the axis passes from one vertex through an opposing vertex. A gimbaled mounting (not shown) allows the rotation of the mirror segment through all orientations.

In any of the embodiments, the axis or axes of rotation are selected to allow alternate exposure of each of a plurality of facets to an incident beam traveling parallel to a major axis of a reflector telescope (not shown). Reference to a facet rather than a face is used, again for clarity. While any cube has six faces not all faces are suitably facets. In the exemplary embodiment, the placement of the axis a means that rotation of the cube about the axis a results in only four of the six faces of the cube can actually be exposed to any incident beam traveling in a generally perpendicular to the axis a. Facets, therefore, shall refer to those faces that by virtue of rotation can be exposed to an incident beam. Referring again to FIG. 1, the mirror segment 10 includes a plurality of facets including a first facet 12 having a figured surface 15 and a second facet 18. Though not shown, two remaining facets are behind the mirror segment 10 as shown.

Each of facets 12 and 18 has at least one optical quality. For example, the first facet 12 is a mirrored surface such that the figured surface 15 is configured to focus light according to the application for which the figured surface 15 is configured. The figured surface 15, might, by way of non-limiting example, be a portion of a parabola in a Newtonian or Cassegrain telescope; a hyperbolic surface for a Ritchey-Chéretien telescope; a concave elliptical surface for a Dall-Kirkham telescope; or, by way of non-limiting example, a paraboloidal surface for use as a Shiefspiegler configuration.

Yet, while the first facet 12 is a mirror, the second facet might, by way of non-limiting example, be configured as a part of a complex compound lens system allowing the incident beam to pass from the second facet 18 through the body of the mirror segment 10 to pass out of the opposing facet (not shown) refracted in accord with the characteristic curve of the lens or prism.

In one embodiment, both of the first facet 12 and the second facet 18 have identical figured surfaces 15. The first facet 12 may, by way of non-limiting example, be suitably coated to optimize the transmission and, therefore, the reflection of the incident spectrum with a wavelength in the infrared portion of the spectrum. The second facet 18 is coated with a suitable coating to optimize transmission in the ultraviolet portion of the spectrum. By rotating the mirror segment 10 to expose the first segment 12, observing the selected phenomenon, rotating the segment to expose the second segment 18, and then observing the selected phenomenon, the telescope enables distinct views of the phenomenon in distinct areas of the electromagnetic spectrum without requiring two distinct telescopes, and, most often, parallax errors in correspondence between the two distinct views the telescopes afford.

Figure 2:
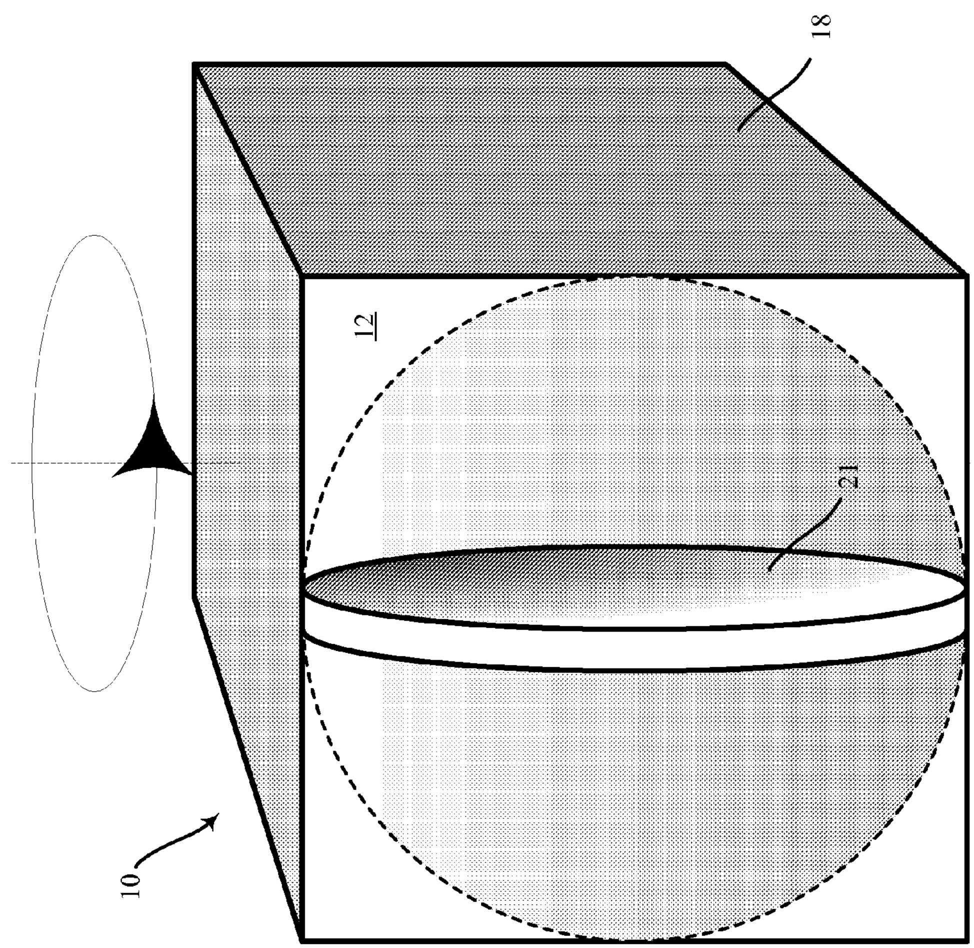
FIG. 2 is a perspective view of the regular cubic embodiment of the primary mirror having a two-sided figured surface.

FIG. 2 depicts an additional embodiment of the mirror segment 10. The first facet 12, in this exemplary embodiment includes a pivoting two-faceted mirror 21. The two-faceted mirror 21 has distinct facets that can be selectively exposed to an incident beam of light. Actuation of a motor within the mirror segment 10 causes the selective exposure of each of the distinct facets.

Figure 3:
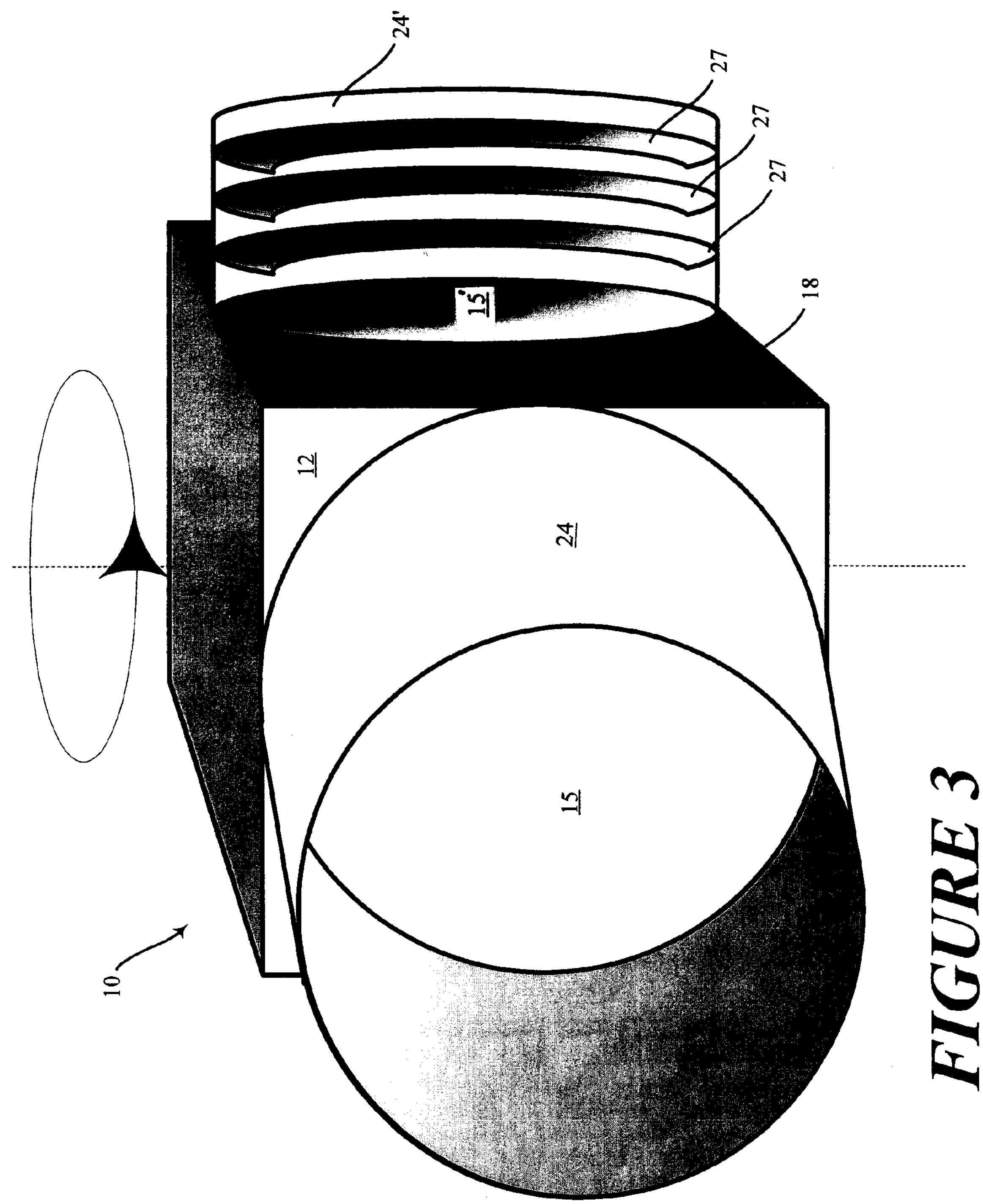
FIG. 3 is a perspective view of the regular cubic embodiment of the primary mirror segment showing a perspective view of a shroud on a first figured surface and a cut-away view of a baffled shroud on a second figured surface.

FIG. 3 depicts a further embodiment of mirror segment 10. Often it is desirable to eliminate light that is traveling along beams that are significantly departing from a path parallel to the principal axis of the telescope—for instance, where the phenomenon to be observed lies at an acute angle relative to a very bright light source such as a star. Beams of light oblique to the principal axis of the telescope might compromise the observation of the phenomenon. Minimizing light from the oblique light source is desirable.

A first strategy for minimizing the oblique light beams from striking the figured surface 15 is a shroud 24. The shroud 24 is a physical barrier preventing any beam from striking the figured surface 15 that originates from an angle greater than a designated angle from the principal axis of the telescope.

Where light may reflect within the shroud 24' (shown here in cutaway) to strike the figured surface 15', a series of baffles 27 are affixed within the shroud 24' to further entrap and physically obstruct incident beams from outside of a cone with the designated angle.

Figure 4:
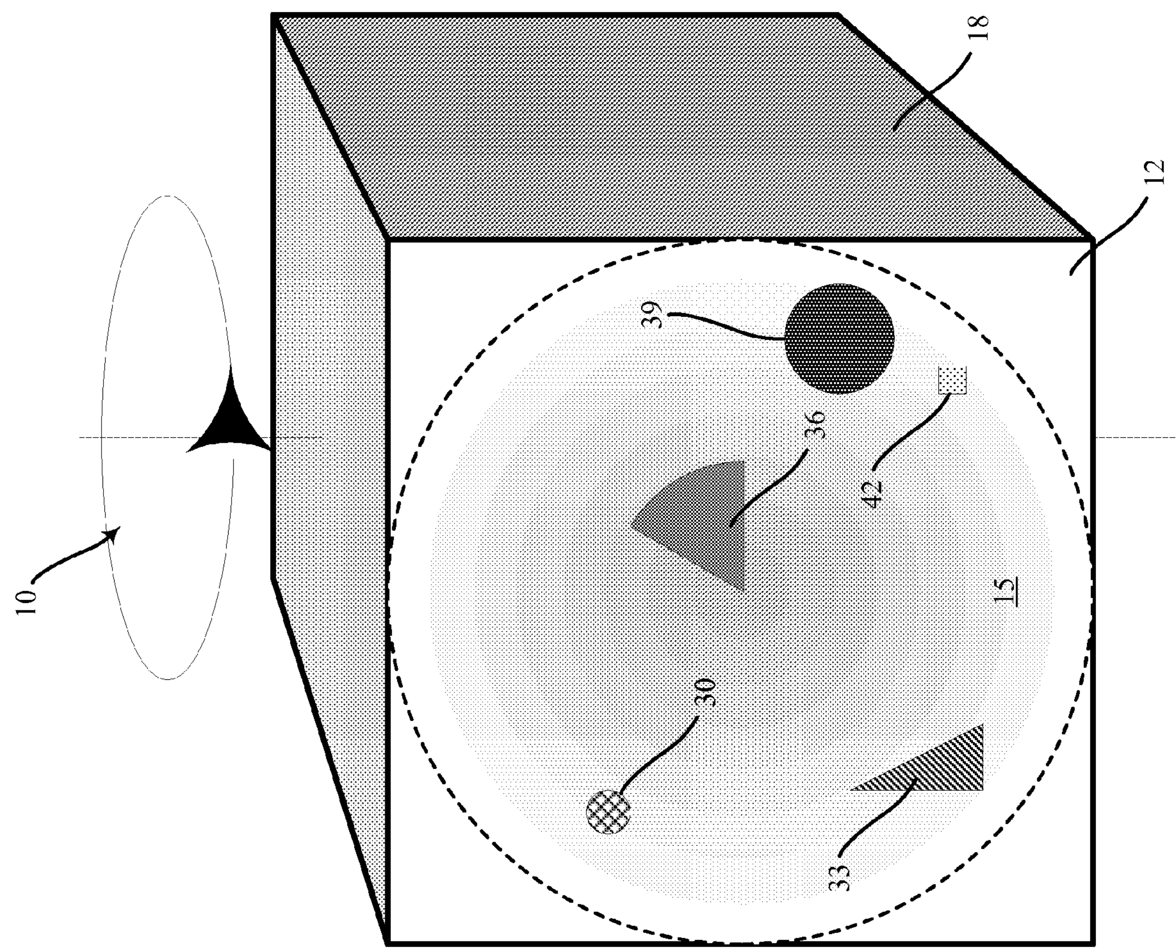
FIG. 4 is a perspective view of the regular cubic embodiment of the primary mirror segment having an interrupted first figured surface including various beam diverting devices.

FIG. 4 depicts a further advantage of the orientable mirror segment 10. Unlike the conventional single surface primary mirror, the orientable mirror has the ability to rotate the first facet 12 into or out of the path of incident light. Because several distinct facets 12, 18 are available for their distinct optical qualities, each can be further specialized for any of a number of sensation means. The figured surface 15 may be interrupted by one or more distinct portals. For example, a heat sensor 30 is advantageously mounted on the figured surface 15 to indicate the downrange heat emitters. Either of a diagonal reflector 33 or a beam splitter 36 may be advantageously included to divert some portion of the incident light to a distinct target for distinct observation. Another such beam diverter, a sub-parabolic reflector, 39, may extend the utility of the telescope by distinct reflection of incident light beams.

As will be discussed below, a collimating laser 42 may be advantageously placed on the figured surface 15. Collimation is the alignment of the optics within a telescope. A laser placed upon the figured surface and properly oriented on the surface allows the orientation of the first facet 12 relative to the remaining optics.

Figure 5:
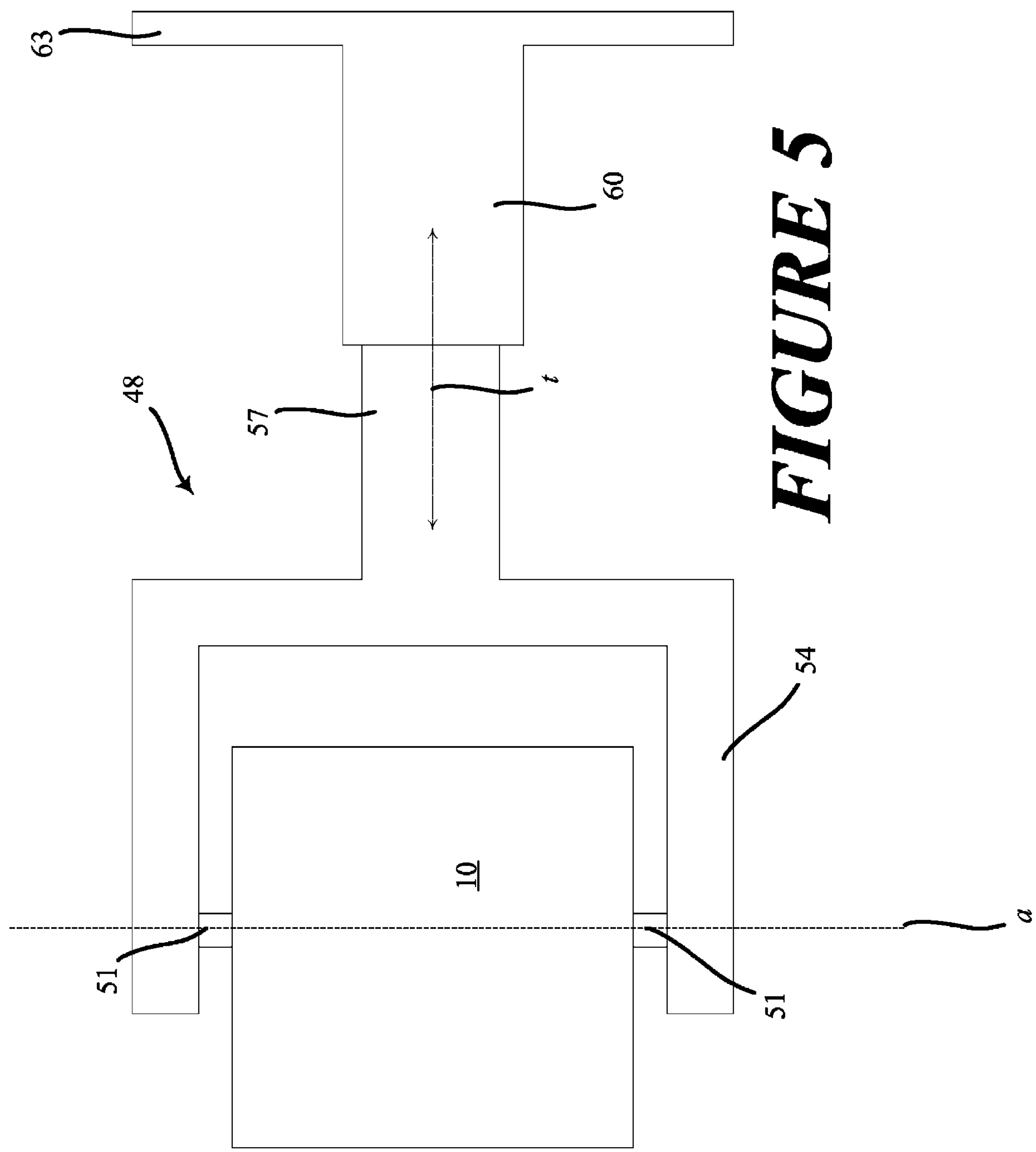
FIG. 5 is a side view of a translational actuator assembly configured to support the regular cubic embodiment of the mirror segment.

FIG. 5 depicts a translational actuator assembly 48 for the mirror segment 10. As discussed above, the rotation of the mirror segment 10 about the axis a occurs in operation to expose a facet (not individually shown) to incident light. Rotation occurs due to rotational actuators 51 in an actuator head 54. Rotation about the axis a is driven in response to a rotational signal sent to the rotational actuator 51.

Within the translational actuator assembly 48, the head 54 is affixed to a shaft 57. The shaft 57 extends out of and retracts into a sleeve 60 responsive to a translational signal. Because the sleeve 60 is affixed to a flange-like foot 63, activation of the translational actuator causes translational movement along a translational axis t.

Figure 6:
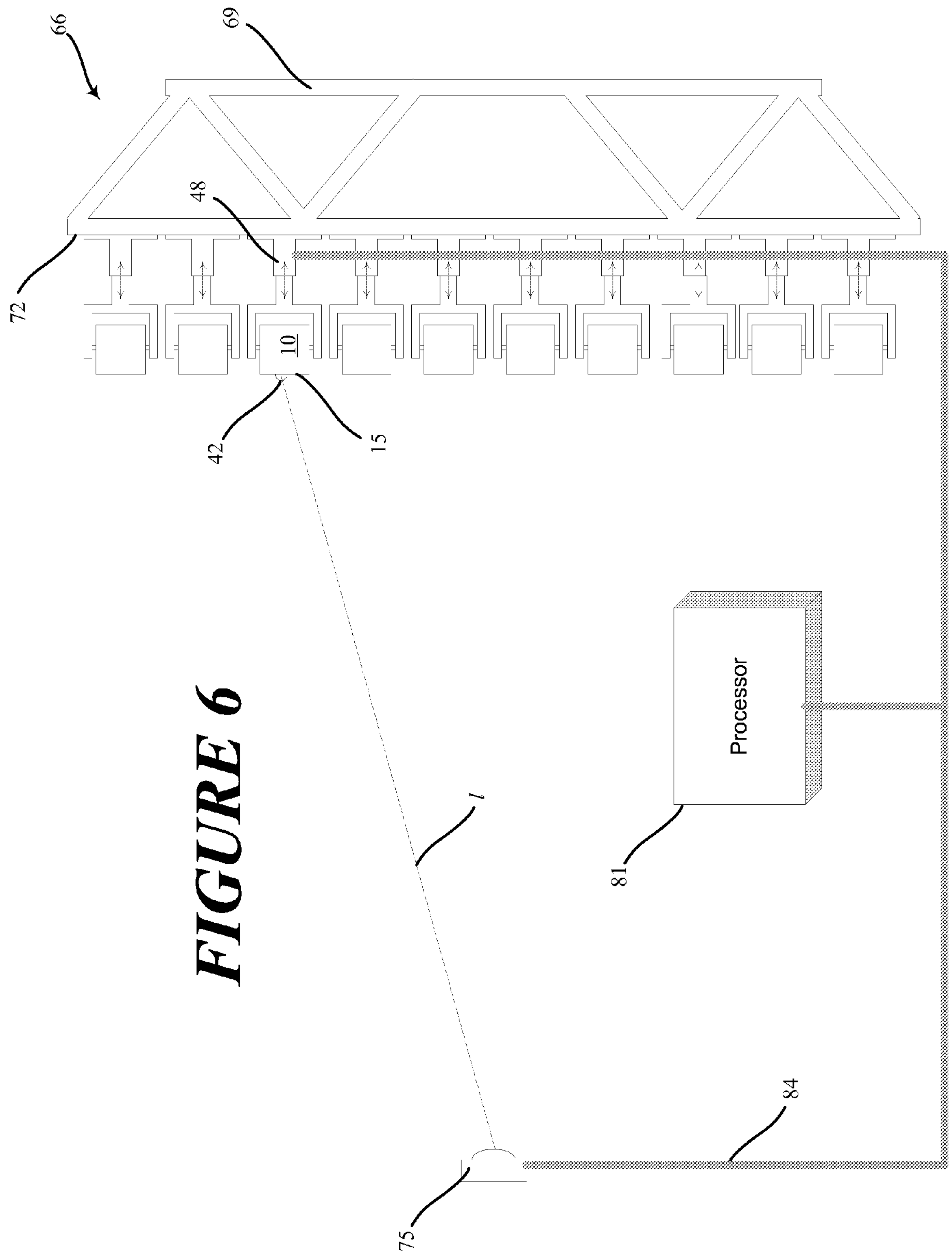
FIG. 6 is a side view of a primary mirror support structure including the multiple translational actuator assemblies in array showing a processor in collimation of the actuator assembly.

FIG. 6 depicts a primary mirror assembly 66 constructed on supporting structure 69 having a generally parabolic surface 72. Affixed to the surface 72 are a series of translational actuator assemblies 48. On each translational actuator assembly 48, the mirror segment 10 includes the laser collimator 42. The laser collimator 42 is oriented on the figured surface 15 to determine an orientation of the figured surface 15. A receptor 75 receives a laser beam l issuing from the laser collimator 42. Within the receptor 75, an array of sensors indicates a precise site where the laser beam l strikes the receptor 75. From the receptor 75 a signal, indicative of the precise site, is relayed by a bus 84 to a processor 81. The processor 81, in turn, sends activation signals to the translational actuator assembly 48, including the rotational actuator 51 (FIG. 5) and the translational actuator, to move figured surface 15 to bring it into collimation. Each translational actuator assembly 48 is similarly collimated at designatable intervals in order to keep the primary mirror assembly 66 fully collimated in spite of gravitational, acceleration, or thermal effects. Because of the repeated collimation of the mirror segments 10, periodic continual collimation assures the same precision as might be achieved with a much heavier, much stiffer primary mirror structure 66.

Figure 7:
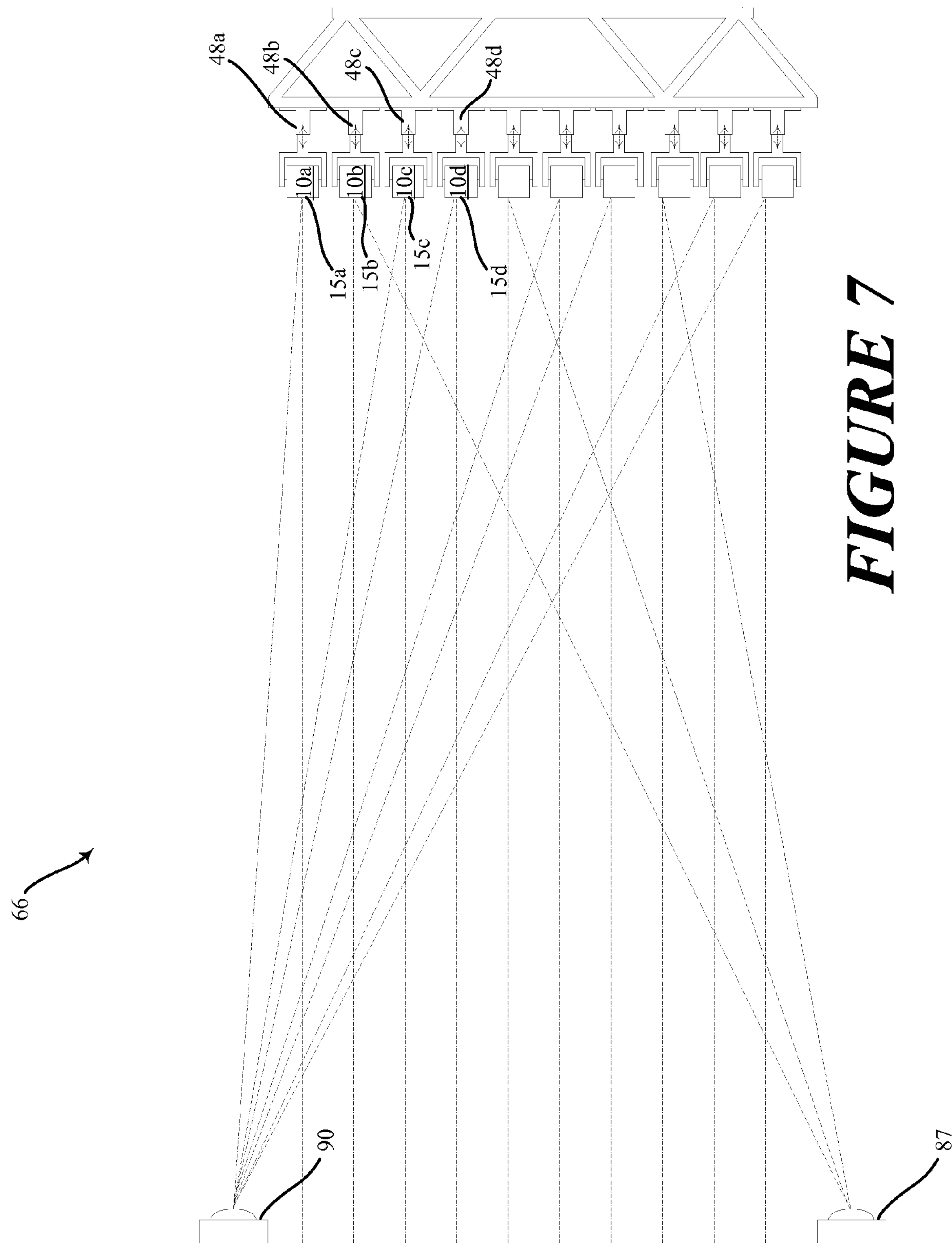
FIG. 7 is a side view of the primary mirror support structure having a set of the translational actuator assemblies reflecting incident beams to a first sensor and a distinct set of the translational actuator assemblies reflecting incident beams to a second sensor.

In FIG. 7, the depicted light paths are shown without secondary mirrors in place. A secondary mirror allows the focus of the light waves to produce an image, although, for a number of scientific observations, the secondary mirror is not necessary. Thus, for illustrative purposes, only the primary mirror is shown, while secondary, and even tertiary mirrors might be interposed without diminishing the teaching purpose of the illustration. In a preferred embodiment, the primary serves several secondary mirrors in Shiefspiegler configuration where the several secondary mirrors are arranged just outside of the scope of incident beams striking the primary along the telescope's principal axis. The several secondary mirrors serve various sensors for simultaneous viewing of a phenomenon at distinct wavelengths. Nonetheless, for clarity, the secondary mirrors have been omitted in FIG. 7.

Incident light beams traveling parallel to the primary axis of the telescope strike the figures surfaces 15*a*, 15*b*, 15*c*, and 15*d* of a plurality of mirror segments 10*a*, 10*b*, 10*c*, and 10*d*. for the purposes of the observation, an infrared sensor 87 and an ultraviolet sensor 90 are selected to record emissions from the phenomenon occurring within the respective wavelengths of the sensors. For the purposes of this illustration, it is further assumed that the ultraviolet sensor 90 requires four times the amount of illumination for accurate observation than does the infrared sensor 87. The processor 81 (FIG. 6) sends distinct signals to each of the actuator assemblies 48*a*, 48*b*, 48*c*, 48*d* causing actuators 48*a*, 48*b*, 48*c*, and 48*d* to rotate the mirror segments 10*a*, 10*b*, 10*c*, and 10*d* to expose figured surfaces 15*a*, 15*c*, and 15*d* to the incident light beams. The selected figured surfaces 15*a*, 15*c*, and 15*d* have as their focal points the ultraviolet sensor 90. Simultaneously, or nearly simultaneously, the processor 81 (FIG. 6) sends a signal to the actuator assembly 48*b* to rotate the mirror segment 10*b* to expose the selected figured surface 15*b* to the incident light beams thereby focusing reflected light beams to a second distinct focal point at the infrared sensor 87.

While the preferred embodiment of the invention has been illustrated and described, as noted above, many changes can be made without departing from the spirit and scope of the invention. For example, rather than two distinct sensors, the primary can be configured to serve multiple distinct secondary mirrors. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A primary mirror of a reflector telescope having a principal axis, the primary mirror comprising:

A structural support framework comprising a generally parabolic surface defining an axis generally orthogonal to the principal axis;

a plurality of spaced apart translational actuators aligned to provide translational motion generally parallel to the principal axis, the translational actuators having a head and a foot and being fixed on the parabolic surface by the foot;

a corresponding plurality of mirror segments, each mirror segment having a plurality of facets, wherein each mirror segment is rotationally attached to one of the translational actuators; and a corresponding plurality of rotational actuators, each actuator attached to the head of one of the translational actuators and configured: (i) to rotate the mirror segment to direct a beam of light striking one of the plurality of facets, and (ii) to rotate each mirror segment to selectively expose each facet of each mirror segment to the beam of light.

2. The primary mirror of claim 1, wherein:

each mirror segment includes, among the plurality of facets, a first facet and a second facet; and each first facet has optical properties distinct from each second facet.

3. The primary mirror of claim 2, wherein:

each facet of each mirror segment had independent optical properties selected from a group consisting of focal length, transparency, refractive index, absorption, reflectivity, and homogeneity of the figured surface.

4. The primary mirror of claim 1, wherein:

each rotational actuator selectively exposes a facet of its corresponding mirror segment to incident light beams generally parallel to the principal axis of the primary mirror.

5. The primary mirror of claim 1, wherein:

each translational actuator selectively translates a facet of its corresponding mirror segment along an axis generally parallel to the principal axis of the primary mirror.

6. The primary mirror of claim 1, wherein:

at least one mirror segment includes a first facet having an interrupted figured surface, the interruption selected from a group consisting of beam splitters collimating lasers, heat sensors, and prisms.

7. A structural support assembly for a primary mirror of a reflector telescope having a principal axis, the support assembly comprising:

a support structure having a generally parabolic surface;

a plurality of spaced apart translational actuators aligned to provide translational motion generally parallel to the principal axis, each translational actuator having a head and a foot and being fixed on the parabolic surface by the foot; and a corresponding plurality of rotational actuators, wherein each actuator is attached to the head of one translational actuator; and a corresponding plurality of polyhedron mirror segments, wherein each mirror segment is attached to one translational actuator and its corresponding rotational actuator such that each mirror segment rotates in only a single axis.

8. The support assembly of claim 7, further comprising a processor operationally connected to the plurality of translational actuators and the plurality of rotational actuators, wherein:

each of the plurality of rotational actuators rotates its respective mirror segment responsive to the processor; and each of the plurality of translational actuators translates its respective mirror segment responsive to the processor.

9. The support assembly of claim 8, further comprising:

at least one collimating laser emitter attached to at least one of the plurality of mirror segments; and at least one collimating laser sensor; and wherein the processor is operationally connected to the collimating laser sensor and the translational actuator and rotational actuator attached to the mirror segment bearing the collimating laser emitter, wherein the processor generates a series of signals that direct the translational actuator and rotational actuator to collimate the mirror segment bearing the collimating laser emitter.

10. The support assembly of claim 9, wherein:

the collimating laser emitter is located at a figured surface of the mirror segment.

11. The support assembly of claim 8, wherein:

the processor generates signals that selectively move at least one mirror segment from a first position wherein a first facet is exposed to incident light beams to a second position wherein a second facet is exposed to incident light beams.

12. The support assembly of claim 11, wherein:

the first facet includes a first figured surface having a first set of optical properties; and the second facet includes a second figured surface having a second set of optical properties distinct from the first set of optical properties.

13. The support assembly of claim 12, wherein:

the first set of optical properties includes a first optical coating; and the second set of optical properties includes a second optical coating distinct from the first optical coating.

14. The primary mirror of claim 1, further comprising:

a corresponding plurality of laser collimators, each laser collimator attached to one of the mirror segments;

at least one collimating laser sensor;

a processor operationally linked to the collimating laser sensor and the plurality of laser collimators, wherein the processor is configured to collimate the mirror segments in response to signals generated by the collimating laser sensor.

15. The primary mirror of claim 1, wherein each mirror segment, independently, is a convex polyhedron.

16. The primary mirror of claim 1, wherein each mirror segment, independently, is a convex polyhedron selected from the group consisting of a tetrahedron, a cube, a octahedron, a dodecahedron, and an icosahedron.

* * * * *